United States Patent
Kawakami et al.

(10) Patent No.: US 12,491,855 B2
(45) Date of Patent: Dec. 9, 2025

(54) ELECTRIC PARKING BRAKE DEVICE FOR VEHICLE

(71) Applicant: Hitachi Astemo, Ltd., Hitachinaka (JP)

(72) Inventors: Hiroo Kawakami, Ibaraki (JP); Koji Usui, Ibaraki (JP); Naotoshi Nakajima, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 530 days.

(21) Appl. No.: 17/913,007

(22) PCT Filed: Nov. 27, 2020

(86) PCT No.: PCT/JP2020/044213
§ 371 (c)(1),
(2) Date: Sep. 20, 2022

(87) PCT Pub. No.: WO2021/199496
PCT Pub. Date: Oct. 7, 2021

(65) Prior Publication Data
US 2023/0147075 A1    May 11, 2023

(30) Foreign Application Priority Data

Mar. 30, 2020  (JP) ................................. 2020-060945

(51) Int. Cl.
*B60T 13/74*   (2006.01)
*F16D 51/22*   (2006.01)
(Continued)

(52) U.S. Cl.
CPC ............ *B60T 13/746* (2013.01); *F16D 51/22* (2013.01); *F16D 65/0081* (2013.01);
(Continued)

(58) Field of Classification Search
CPC ........... F16D 2121/24; F16D 2051/005; B60T 13/741
See application file for complete search history.

(56) References Cited

U.S. PATENT DOCUMENTS 5,590,742 A *   1/1997   Gutelius ................. F16D 55/22
                                                    188/205 R
2001/0037919 A1 * 11/2001   Kikuta .................... F16D 51/48
                                                    188/74

FOREIGN PATENT DOCUMENTS

JP        63-318328        12/1988
JP        07293603 A  *   11/1995
(Continued)

OTHER PUBLICATIONS

Machine translation of JP 07293603 (no date).*
(Continued)

*Primary Examiner* — Nicholas J Lane
(74) *Attorney, Agent, or Firm* — Wenderoth, Lind & Ponack, L.L.P.

(57) ABSTRACT

An electric parking brake device for a vehicle, including: a drum brake arranged on a radially inner side of a rim portion; and an electric actuator which enables obtaining a parking brake state by driving the drum brake, the electric actuator being mounted to a side surface of a back plate on an inner side in a vehicle-width direction. An ice and snow accumulation suppressing member (54) including a wall portion (54a), which extends from the back plate to the inner side in the vehicle-width direction while facing an inner peripheral surface of the rim portion (40b) and which is arranged at least below an anchor portion (21), is mounted to an outer peripheral edge portion of the back plate (13). With this configuration, collision of ice and snow refrozen in a wheel with the electric actuator can be prevented.

4 Claims, 4 Drawing Sheets

(51) Int. Cl.
  *F16D 65/00* (2006.01)
  *F16D 65/09* (2006.01)
  *F16D 51/00* (2006.01)
  *F16D 121/24* (2012.01)

(52) U.S. Cl.
  CPC ........ *F16D 65/09* (2013.01); *F16D 2051/005* (2013.01); *F16D 2121/24* (2013.01)

(56) References Cited

FOREIGN PATENT DOCUMENTS

| | | |
|---|---|---|
| JP | 2006-71042 | 3/2006 |
| JP | 2020-8162 | 1/2020 |
| JP | 2020-8165 | 1/2020 |
| JP | 2020-51519 | 4/2020 |

OTHER PUBLICATIONS

International Search Report issued Jan. 12, 2021 in corresponding International Application No. PCT/JP2020/044213, with English translation.
Written Opinion of the International Searching Authority issued Jan. 12, 2021 in corresponding International Application No. PCT/JP2020/044213, with English translation.
Extended European Search Report issued Sep. 5, 2023 in corresponding European Patent Application No. 20928497.5.

\* cited by examiner

ELECTRIC PARKING BRAKE DEVICE FOR VEHICLE

TECHNICAL FIELD

The present invention relates to an electric parking brake device for a vehicle, including: a drum brake which includes a pair of brake shoes rotatably supported by an anchor portion provided in a lower portion of a back plate and which is arranged on a radially inner side of a rim portion of a wheel of a vehicle wheel; and an electric actuator which enables obtaining a parking brake state by driving the drum brake, the electric actuator being mounted to a side surface of the back plate on an inner side in a vehicle-width direction.

BACKGROUND ART

An electric parking brake device for a vehicle in which an electric actuator is mounted to an outer surface of a back plate of a drum brake, and a parking brake force is obtained by power exerted by the electric actuator has been known from Patent Literature 1 and Patent Literature 2.

CITATION LIST

Patent Literature

PTL 1: JP 2020-8162 A
PTL 2: JP 2020-8165 A

SUMMARY OF INVENTION

Technical Problem

Incidentally, when a vehicle equipped with an electric parking brake device travels during snowfall, the snow adhering to the inside of a wheel of a vehicle wheel may be melted at the time of stopping of the vehicle and then refrozen in a lower portion of the wheel. In this case, when the refrozen ice and snow rotate together with the wheel due to the start of movement of the vehicle, the ice and snow after being refrozen may collide with an electric actuator mounted to an outer surface of a back plate, which may influence the electric actuator.

Meanwhile, in Patent Literature 1, before the accumulated matter formed of snow and mud adhering to an inner peripheral surface of a wheel interferes with the electric actuator at the time of traveling of the vehicle, the accumulated matter is scraped off with a protective member attached to a stationary member of a drum brake, to thereby prevent the electric actuator from being damaged. In addition, in Patent Literature 2, the adhering matter adhering to an inner peripheral surface of a wheel is removed with a protector, such as a scraper or a barrier, which is arranged at a position displaced in a circumferential direction from a part of the electric actuator closest to the inner peripheral surface of the wheel, to thereby prevent the electric actuator from being damaged. According to the technologies disclosed in Patent Literature 1 and Patent Literature 2, the ice and snow after being refrozen can be prevented from colliding with the electric actuator. However, the protective member and the protector need to destroy the ice and snow, and hence are required to have high rigidity.

The present invention has been made in view of the above-mentioned circumstances, and has an object to provide an electric parking brake device for a vehicle capable of preventing the collision of ice and snow refrozen in a wheel with an electric actuator through use of a member that is not required to have high rigidity.

Solution to Problem

In order to achieve the object described above, the present invention has a first feature that there is provided an electric parking brake device for a vehicle, including: a drum brake which includes a pair of brake shoes rotatably supported by an anchor portion provided in a lower portion of a back plate and which is arranged on a radially inner side of a rim portion of a wheel of a vehicle wheel; and an electric actuator which enables obtaining a parking brake state by driving the drum brake, the electric actuator being mounted to a side surface of the back plate on an inner side in a vehicle-width direction, wherein an ice and snow accumulation suppressing member including a wall portion, which extends from the back plate to the inner side in the vehicle-width direction while facing an inner peripheral surface of the rim portion and which is arranged at least below the anchor portion, is mounted to an outer peripheral edge portion of the back plate, and wherein, on a projected figure on a plane orthogonal to a rotation axis of the vehicle wheel, an outermost edge of the wall portion along a radial direction of the back plate is arranged outside of an imaginary circle which passes through an outermost end of the electric actuator in the radial direction and which is centered on the rotation axis.

Further, in addition to the configuration of the first feature, the present invention has a second feature that, the wall portion is formed into an annular shape centered on the rotation axis.

In addition to the configuration of the second feature, the present invention has a third feature that, the wall portion is formed into a shape that is increased in diameter with distance from the back plate.

In addition to the configuration of the second or third feature, the present invention has a fourth feature that, a wheel cylinder configured to exert power for obtaining a service brake state in the drum brake is mounted to an upper portion of the back plate, and a cutout is formed in a peripheral edge portion of the wall portion on an opposite side of the back plate at least above the rotation axis of the vehicle wheel.

Still further, in addition to the configurations of the first to fourth features, the present invention has a fifth feature that, the ice and snow accumulation suppressing member formed of an iron-based metal is welded directly to the back plate or to a mounting member firmly attached to the back plate.

Advantageous Effects of Invention

According to the first feature of the present invention, the wall portion of the ice and snow accumulation suppressing member mounted to the outer peripheral edge portion of the back plate extends from the back plate to the inner side in the vehicle-width direction while facing the rim portion of the wheel and is arranged at least below the anchor portion, and on the projected figure on the plane orthogonal to the rotation axis of the vehicle wheel, the outermost edge of the wall portion along the radial direction of the back plate is arranged outside of the imaginary circle which passes through the outermost end of the electric actuator and which is centered on the rotation axis. As a result, even when ice and snow are refrozen in a lower portion of the wheel, the refrozen ice and snow pass through an outer side of the electric actuator when rotating together with the wheel. Thus, the collision of the refrozen ice and snow with the electric actuator can be prevented, and the influence caused by the collision of the ice and snow does not occur in the electric actuator. That is, it is only required that the ice and snow accumulation suppressing member have the function of defining the maximum size of the ice and snow refrozen in the lower portion of the wheel, and it is not required that the ice and snow accumulation suppressing member have high rigidity.

In addition, according to the second feature of the present invention, the wall portion of the ice and snow accumulation suppressing member is formed into an annular shape. As a result, the snow is less liable to enter the inside of the wheel, and the refreezing of the ice and snow in the lower portion of the wheel is suppressed.

According to the third feature of the present invention, the wall portion of the ice and snow accumulation suppressing member is formed into a shape that is increased in diameter with distance from the back plate. As a result, the intrusion of the snow into an area between the wheel and the wall portion can be more reliably suppressed by suppressing the gap between the outermost edge of the wall portion and the rim portion of the wheel to be small while preventing the interference of the wall portion with the electric actuator. In addition, even when the snow adheres to the inner side of the wall portion, the melt snow is easily allowed to slide to be discharged to the outside. Thus, the snow is less liable to be accumulated in the wall portion, and the refreezing in the lower portion of the wheel can also be suppressed.

According to the fourth feature of the present invention, the wheel cylinder is mounted to the upper portion of the back plate, and the cutout is formed in the peripheral edge portion of the wall portion on the opposite side of the back plate at least above the rotation axis of the vehicle wheel. As a result, the maintenance related to the wheel cylinder at the time of mounting of piping connected to the wheel cylinder and the like is facilitated.

Further, according to the fifth feature of the present invention, the ice and snow accumulation suppressing member is formed of an iron-based metal, and the ice and snow accumulation suppressing member is welded directly to the back plate or to a mounting member firmly attached to the back plate. As a result, the mounting of the ice and snow accumulation suppressing member to the back plate is facilitated.

REFERENCE SIGNS LIST 13 back plate
15,16 brake shoe
17 wheel cylinder
21 anchor portion
40 wheel
40b rim portion
42 dust cover that is mounting member
44 electric actuator
54 snow accumulation suppressing member
54a wall portion
54aa outermost edge of wall portion
55 cutout
B drum brake
C rotation axis

DESCRIPTION OF EMBODIMENT

An embodiment of the present invention is described with reference to the accompanying FIG. 1 to FIG. 4.

First Embodiment

Figure 1:
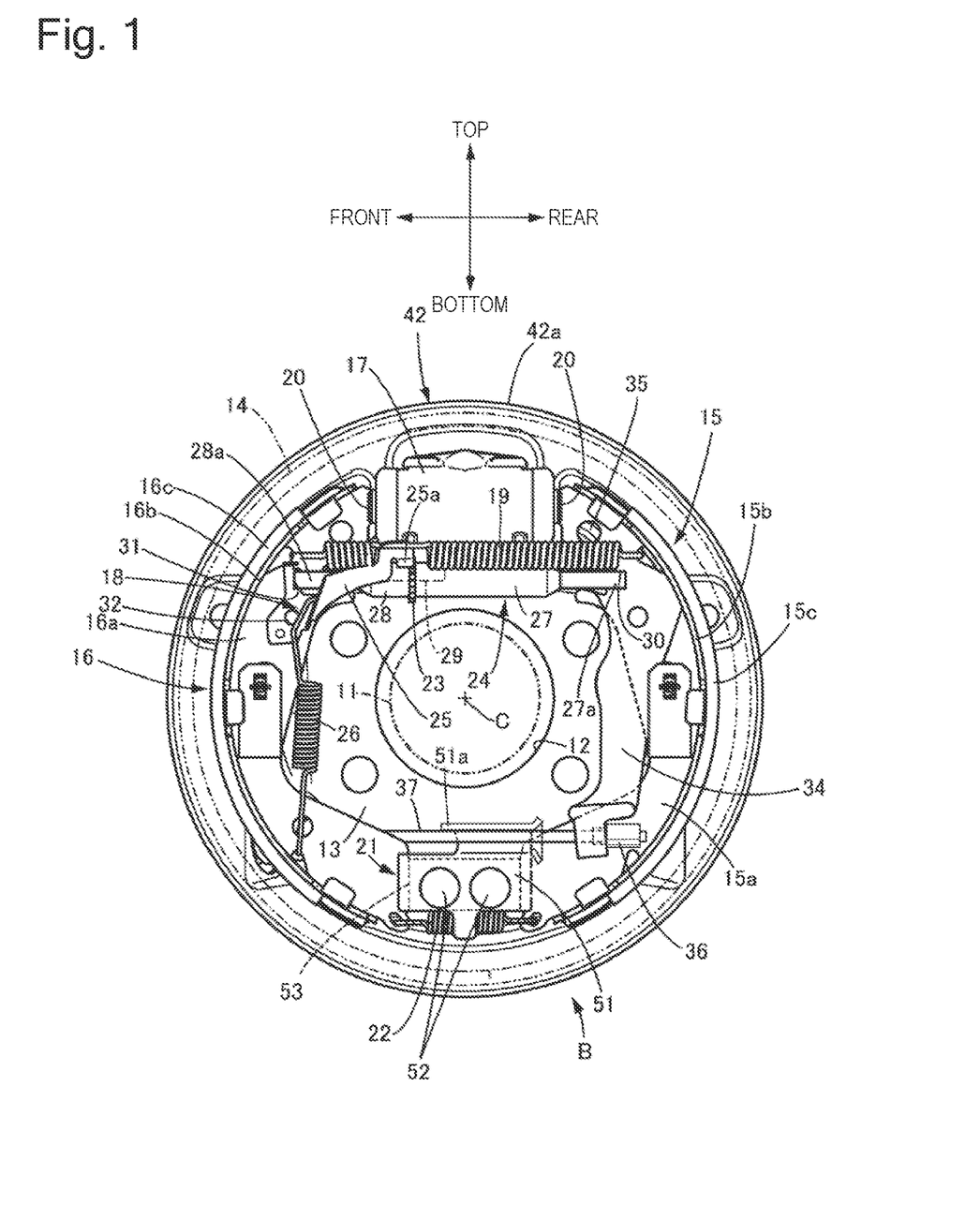
FIG. 1 is a front view of an electric parking brake device and is a view seen from the direction indicated by the arrow 1 of FIG. 4 (first embodiment).

First, in FIG. 1, a drum brake B is provided on, for example, a left rear wheel of a four-wheeled vehicle, and the drum brake B includes: a fixed back plate 13 having, in a center portion, a through hole 12 for allowing an axle 11 of the left rear wheel to pass therethrough; first and second brake shoes 15 and 16 arranged in the back plate 13 so as to be brought into slide contact with an inner periphery of a brake drum 14 that rotates together with the left rear wheel; a wheel cylinder 17 fixed to an inner side of an upper portion of the back plate 13 so as to exert a force for causing the first and second brake shoes 15 and 16 to operate to expand; braking gap automatic adjustment means (so-called auto adjuster) 18 for automatically adjusting the gap between the first and second brake shoes 15 and 16 and the brake drum 14; and return springs 19 provided between the first and second brake shoes 15 and 16.

The first and second brake shoes 15 and 16 include: first and second webs 15a and 16a each formed in a bow-like flat plate shape along the inner periphery of the brake drum 14; first and second rims 15b and 16b formed continuously from the first and second webs 15a and 16a so as to be orthogonal to outer peripheries thereof, respectively; and first and second linings 15c and 16c bonded to outer peripheries of the first and second rims 15b and 16b, respectively.

An anchor portion 21 serving as a fulcrum at the time of expansion and contraction of the first and second brake shoes 15 and 16 is provided in a lower portion of the back plate 13, and lower end portions of the first and second webs 15a and 16a are rotatably supported by the anchor portion 21. In addition, the wheel cylinder 17 is fixed to an upper portion of the back plate 13 between upper end portions of the first and second brake shoes 15 and 16 so as to operate with the output hydraulic pressure of a master cylinder (not shown) operated by a brake pedal to exert a force for driving the first and second brake shoes 15 and 16 to an expansion side through use of the anchor portion 21 as a fulcrum, and outer end portions of a pair of pistons 20 provided in the wheel cylinder 17 are arranged so as to be opposed to the other end portions (upper end portions in this embodiment) of the first and second webs 15a and 16a.

A coil spring 22 that urges the lower end portions of the first and second webs 15a and 16a to the anchor portion 21 side is provided between the one end portions of the first and second webs 15a and 16a, and a pair of return springs 19 that urge the first and second brake shoes 15 and 16 in a contraction direction are provided between the upper end portions of the first and second webs 15a and 16a.

The braking gap automatic adjustment means 18 includes: a contraction position regulating strut 24 which is formed between the first and second webs 15a and 16a included in the first and second brake shoes 15 and 16 and which can be extended by rotation of an adjusting gear 23; an adjusting lever 25 which has a feed claw 25a that is engaged with the adjusting gear 23 and which is rotatably supported by the second web 16a of the second brake shoe 16 of the first and second brake shoes 15 and 16; and an adjusting spring 26 that urges the adjusting lever 25 to rotate to the side on which the adjusting gear 23 rotates in a direction of extending the contraction position regulating strut 24.

The contraction position regulating strut 24 regulates the contraction positions of the first and second brake shoes 15 and 16, and includes: a first rod 27 having a first engaging and coupling portion 27a that is engaged with a position closer to the upper end portion of the first web 15a included in the first brake shoe 15 of the first and second brake shoes 15 and 16; a second rod 28 which has a second engaging and coupling portion 28a that is engaged with a position closer to the upper end portion of the second web 16a included in the second brake shoe 16 and which is arranged coaxially with the first rod 27; and an adjusting bolt 29 having one end portion that is inserted into the first rod 27 so as to be relatively movable in an axis direction and having the other end portion that is threadedly engaged with the second rod 28 coaxially. The adjusting gear 23 is formed on an outer periphery of the adjusting bolt 29 so as to be arranged between the first and second rods 27 and 28.

A first locking recess 30 for engaging the first engaging and coupling portion 27a is formed on a side edge facing the axle 11 side closer to the upper end portion of the first web 15a, and a second locking recess 31 for engaging the second engaging and coupling portion 28a is formed on a side edge facing the axle 11 side closer to the upper end portion of the second web 16a.

The adjusting lever 25 having the feed claw 25a that is engaged with the adjusting gear 23 is rotatably supported by the second web 16a through the intermediation of a support shaft 32, and the adjusting spring 26 is provided between the second web 16a and the adjusting lever 25. Further, the spring force of the adjusting spring 26 is set to be smaller than the spring force of the return springs 19.

In the braking gap automatic adjustment means 18, at the time of causing the first and second brake shoes 15 and 16 to operate to expand through the operation of the wheel cylinder 17, when the first and second brake shoes 15 and 16 expand by a certain value or more due to the abrasion of the first and second linings 15c and 16c, the adjusting lever 25 rotates about the axis of the support shaft 32 due to the spring force of the adjusting spring 26. As a result, the effective length of the contraction position regulating strut 24 is corrected to be increased in accordance with the rotation of the adjusting gear 23.

Incidentally, the drum brake B includes a parking brake lever 34 capable of generating a parking brake force in accordance with the operation, and the parking brake lever 34 is arranged so as to overlap with a part of the first web 15a in the first brake shoe 15 in front view (direction illustrated in FIG. 1) in a direction along the rotation axis of the brake drum 14 and is extended long along a longitudinal direction of the first web 15a.

An engaging piece 36 fixed to one end portion of a brake cable 37 through, for example, caulking is engaged with a lower end portion of the parking brake lever 34, and an upper end portion of the parking brake lever 34 is coupled to the upper end portion of the first web 15a in the first brake shoe 15 through the intermediation of a pin 35.

When the parking brake of a vehicle operates, the parking brake lever 34 is driven to rotate in a clockwise direction of FIG. 1 through use of the pin 35 as a fulcrum by the pulling force input from the brake cable 37. Due to the rotation of the parking brake lever 34, a force in a direction in which the second lining 16c included in the brake shoe 16 is brought into pressure contact with the inner periphery of the brake drum 14 acts on the second brake shoe 16 via the contraction position regulating strut 24. Further, when the parking brake lever 34 is continuously driven to rotate in the clockwise direction of FIG. 1, the parking brake lever 34 rotates through use of the engagement portion with the first engaging and coupling portion 27a of the contraction position regulating strut 24 as a fulcrum. Then, the first brake shoe 15 operates to expand through intermediation of the pin 35, and the first lining 15c of the first brake shoe 15 is brought into pressure contact with the inner periphery of the brake drum 14. That is, the parking brake lever 34 operates to an operation position at which the first and second linings 15c and 16c of the first and second brake shoes 15 and 16 are brought into pressure contact with the inner periphery of the brake drum 14, and under this state, a parking brake state is obtained.

In addition, when the application of the rotational drive force to the parking brake lever 34 is stopped by loosening the brake cable 37, the parking brake lever 34 returns to a non-operation position together with the first and second brake shoes 15 and 16 that operate due to the spring force of the return springs 19 in a direction of separating from the inner periphery of the brake drum 14.

Figure 2:
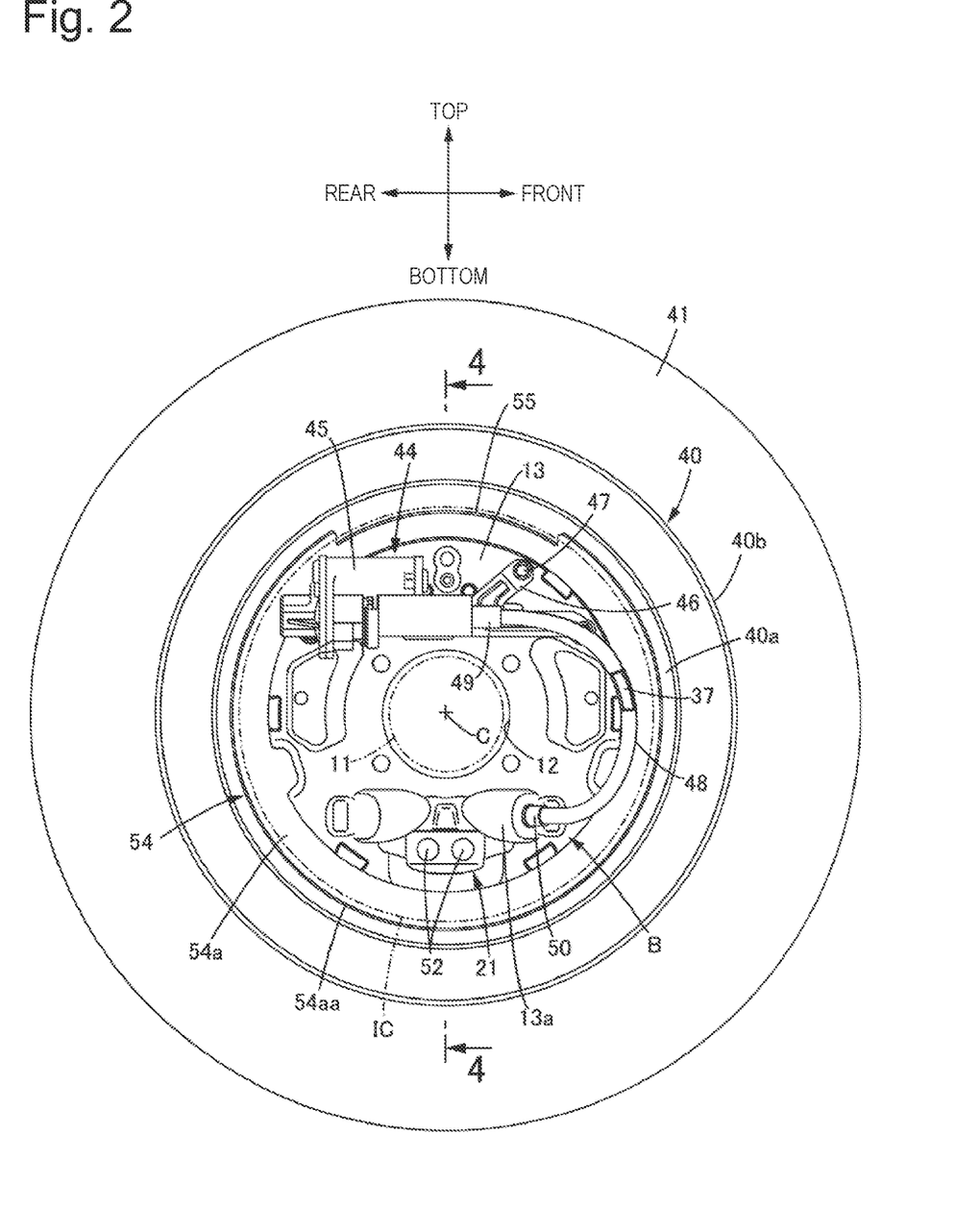
FIG. 2 is a view of a left rear wheel having the electric parking brake device mounted thereto when seen from an inner side in a vehicle-width direction (first embodiment).
Figure 3:
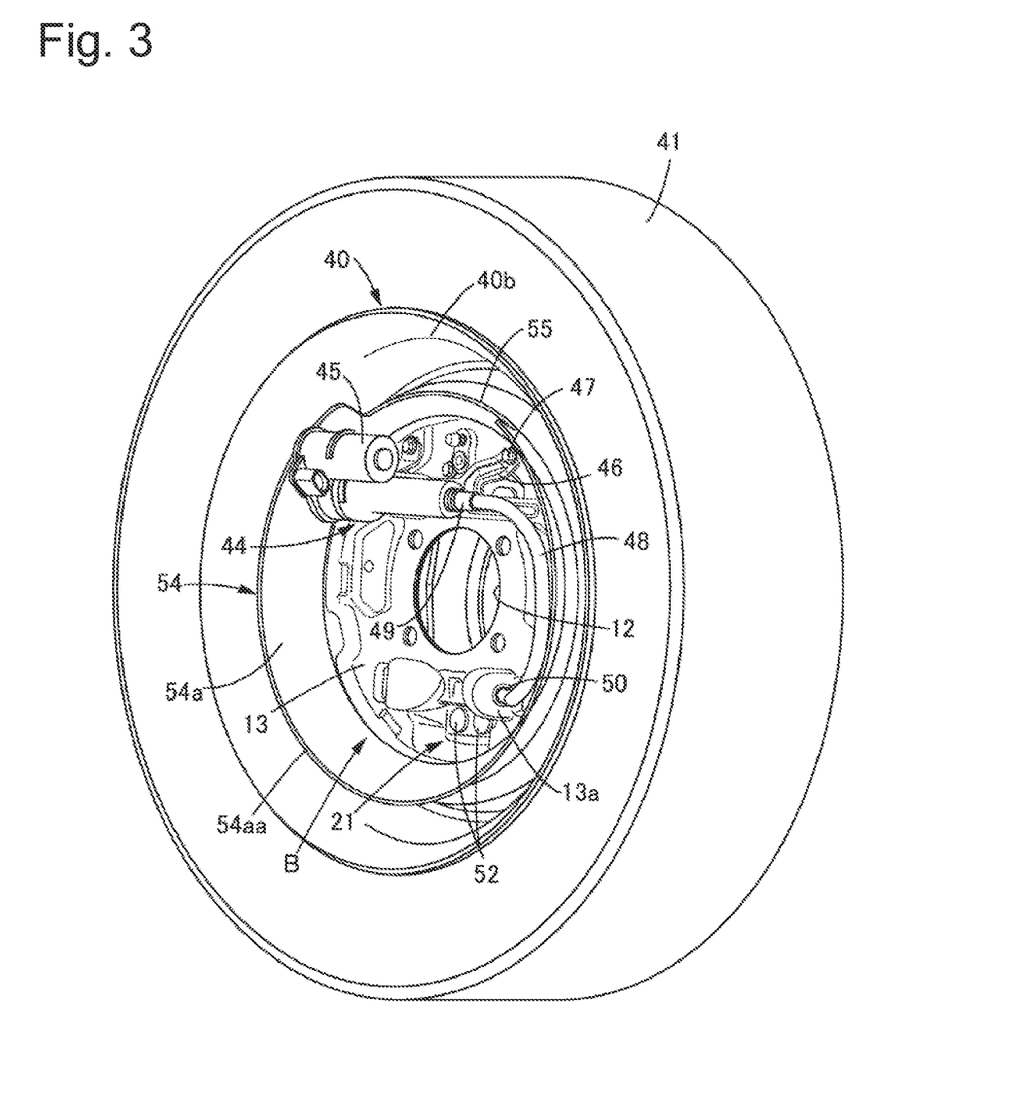
FIG. 3 is a perspective view of the left rear wheel having the electric parking brake device mounted thereto when seen from a diagonally forward direction on the inner side in the vehicle-width direction (first embodiment).
Figure 4:
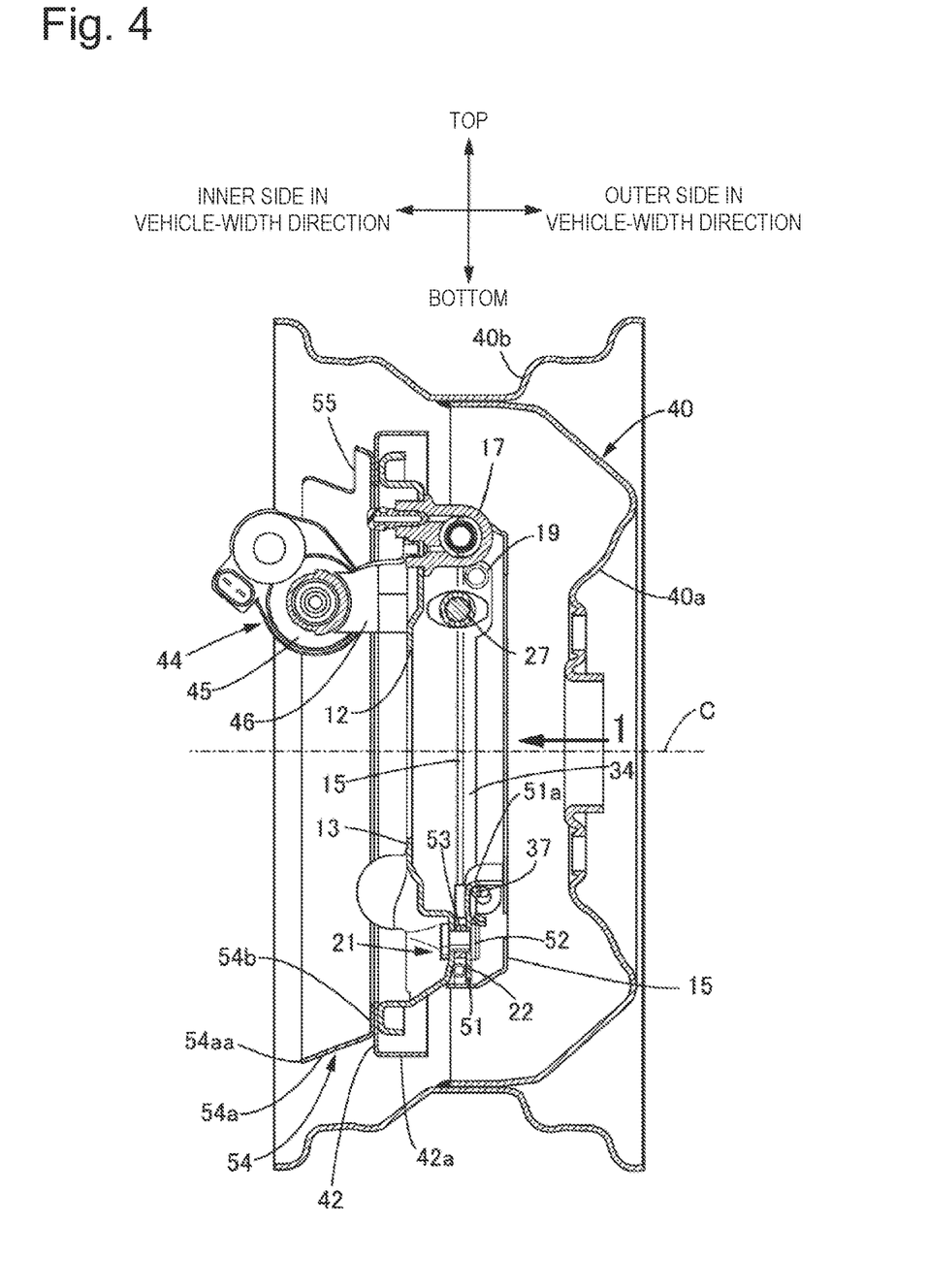
FIG. 4 is a sectional view for illustrating a part of the electric parking brake device and a wheel taken along the line 4-4 of FIG. 2 (first embodiment).

Also referring to FIG. 2 to FIG. 4, the vehicle wheel, for example, the left rear wheel includes a wheel 40 having a rim portion 40b fixedly installed on an outer periphery of a disc portion 40a and a tire 41 mounted to the rim portion 40b of the wheel 40, and the drum brake B is arranged on a radially inner side of the rim portion 40b. The back plate 13 of the drum brake B is fixed to, for example, a knuckle (not shown) forming a part of a suspension so as to be arranged on an inner side in a vehicle-width direction from the disc portion 40a of the wheel 40. In addition, the brake drum 14 of the drum brake B is fixed to the axle 11 together with the disc portion 40a of the wheel 40. Further, a dust cover 42 including a cylindrical portion 42a that covers an end portion of the brake drum 14 on the inner side in the vehicle-width direction from a radially outward direction of the brake drum 14 is firmly attached to an outer surface of the back plate 13, that is, an outer peripheral edge portion of a side surface facing the inner side in the vehicle-width direction by, for example, welding.

The parking brake state is obtained by driving the drum brake B through use of the electric actuator 44, and the brake cable 37 is pulled by the power exerted by the electric actuator 44. An actuator case 45 included in the electric actuator 44 is mounted, through intermediation of a mounting member 46, to an upper portion of a side surface of the back plate 13 on an opposite side of the wheel cylinder 17 fixed to the inner side of the upper portion of the back plate 13 so as to exert power for obtaining a service brake state in the drum brake B, that is, the upper portion of the side surface of the back plate 13 on the inner side in the vehicle-width direction. The mounting member 46 is firmly attached to the actuator case 45, and the mounting member 46 is fastened to the back plate 13 with a plurality of bolts 47.

A tubular portion 13a is integrally provided so as to project from a front portion along a vehicle front-and-rear direction of the lower portion of the back plate 13. The brake cable 37 is introduced into the back plate 13 from the tubular portion 13a and is routed so as to be located below the axle 11 in the back plate 13 under the state in which the drum brake B is mounted to the vehicle wheel.

The brake cable 37 is covered with an outer cable 48 between the actuator case 45 and the tubular portion 13a. Both end portions of the outer cable 48 are mounted to the actuator case 45 and the tubular portion 13a through intermediation of guide tubes 49 and 50, respectively.

Referring back to FIG. 1, in the anchor portion 21 that supports the lower end portions of the first and second webs 15a and 16a in the first and second brake shoes 15 and 16, a plate 53 that is brought into abutment against the lower end portions of the first and second webs 15a and 16a and a holding member 51 that sandwiches the one end portions of the first and second webs 15a and 16a with the back plate 13 so as to prevent the first and second brake shoes 15 and 16 from coming off the back plate 13 are fixed to the back plate 13 with a pair of rivets 52 so that the plate 53 is sandwiched between the back plate 13 and the holding member 51.

In addition, a guide portion 51a that guides the brake cable 37 is integrally provided to the holding member 51 so as to have a substantially U-shaped transverse sectional shape.

According to the present invention, an ice and snow accumulation suppressing member 54 including a wall portion 54a, which extends from the back plate 13 to the inner side in the vehicle-width direction while facing an inner periphery of the rim portion 40b of the wheel 40 and which is arranged at least below the anchor portion 21, is mounted to the outer peripheral edge portion of the back plate 13.

Further, on a projected figure on a plane orthogonal to a rotation axis C of the vehicle wheel, as illustrated in FIG. 2, an outermost edge 54aa of the wall portion 54a along a radial direction of the back plate 13 is arranged outside of an imaginary circle IC which passes through an outermost end of the electric actuator 44 in the radial direction and which is centered on the rotation axis C.

In addition, the wall portion 54a is formed into an annular shape centered on the rotation axis C, and the ice and snow accumulation suppressing member 54 integrally includes the wall portion 54a and an inward flange portion 54b that protrudes in a radially inward direction from an end portion of the wall portion 54a on the back plate 13 side. Further, the wall portion 54a is formed into a shape that is increased in diameter with distance from the back plate 13, and is formed into a tapered shape in this embodiment.

Incidentally, the wheel cylinder 17 that exerts the power for obtaining the service brake state in the drum brake B is mounted to the upper portion of the back plate 13, and a cutout 55 is formed in a peripheral edge portion of the wall portion 54a on an opposite side of the back plate 13 at least above the rotation axis C of the vehicle wheel. In this embodiment, the cutout 55 is formed in the peripheral edge portion of the wall portion 54a so as to be located above the wheel cylinder 17.

In addition, the ice and snow accumulation suppressing member 54 is formed of an iron-based metal, and the ice and snow accumulation suppressing member 54 is welded directly to the back plate 13 or to the mounting member firmly attached to the back plate 13. In this embodiment, the dust cover 42 that is the mounting member is firmly attached to the outer peripheral edge portion of the back plate 13, and the inward flange portion 54b of the ice and snow accumulation suppressing member 54 is mounted to the back plate 13 so as to sandwich the dust cover 42 with the back plate 13. The ice and snow accumulation suppressing member 54 may be welded to the dust cover 42, or the ice and snow accumulation suppressing member 54 may be welded to the back plate 13 together with the dust cover 42.

Next, the action of this embodiment is described. The ice and snow accumulation suppressing member 54 including the wall portion 54a, which extends from the back plate 13 to the inner side in the vehicle-width direction while facing the inner periphery of the rim portion 40b of the wheel 40 and which is arranged at least below the anchor portion 21, is mounted to the outer peripheral edge portion of the back plate 13 in the drum brake B, and on the projected figure on the plane orthogonal to the rotation axis C of the vehicle wheel, the outermost edge 54aa of the wall portion 54a along the radial direction of the back plate 13 is arranged outside of the imaginary circle IC which passes through the outermost end of the electric actuator 44 in the radial direction and which is centered on the rotation axis C. As a result, even when ice and snow are refrozen in the lower portion of the wheel 40, the refrozen ice and snow pass through the outer side of the electric actuator 44 when rotating together with the wheel 40. Thus, the collision of the refrozen ice and snow with the electric actuator 44 can be prevented, and the influence caused by the collision of the ice and snow does not occur in the electric actuator 44. That is, it is only required that the ice and snow accumulation suppressing member 54 have the function of defining the maximum size of the ice and snow refrozen in the lower portion of the wheel 40, and it is not required that the ice and snow accumulation suppressing member 54 have high rigidity.

In addition, the wall portion 54a is formed into an annular shape centered on the rotation axis C. As a result, the snow is less liable to enter the inside of the wheel 44, and the refreezing of the ice and snow in the lower portion of the wheel 40 is suppressed.

In addition, the wall portion 54a is formed into a shape that is increased in diameter with distance from the back plate 13. As a result, the intrusion of the snow into an area between the wheel 40 and the wall portion 54a can be more reliably suppressed by suppressing the gap between the outermost edge 54aa of the wall portion 54a and the rim portion 40b of the wheel 40 to be small while preventing the interference of the wall portion 54a with the electric actuator 44. In addition, even when the snow adheres to the inner side of the wall portion 54a, the melt snow is easily allowed to slide to be discharged to the outside. Thus, the snow is less liable to be accumulated in the wall portion 54a, and the refreezing in the lower portion of the wheel 40 can also be suppressed.

In addition, the wheel cylinder 17 that exerts the power for obtaining the service brake state in the drum brake B is mounted to the upper portion of the back plate 13, and the cutout 55 is formed in the peripheral edge portion of the wall portion 54a on the opposite side of the back plate 13 at least above the rotation axis C of the vehicle wheel. As a result, the maintenance related to the wheel cylinder 17 at the time of mounting of piping connected to the wheel cylinder 17 and the like is facilitated.

Further, the ice and snow accumulation suppressing member 54 formed of an iron-based metal is welded directly to the back plate 13 or to the dust cover 42 firmly attached to the back plate 13. As a result, the mounting of the ice and snow accumulation suppressing member 54 to the back plate 13 is facilitated.

The embodiment of the present invention has been described. However, the present invention is not limited to the above-mentioned embodiment. Various changes in design can be made without departing from the scope of the gist of the present invention.

The invention claimed is:

1. An electric parking brake device for a vehicle, comprising:
a drum brake which includes a pair of brake shoes rotatably supported by an anchor portion provided in a lower portion of a back plate and which is arranged on a radially inner side of a rim portion of a wheel of a vehicle wheel; and
an electric actuator which enables obtaining a parking brake state by driving the drum brake, the electric actuator being mounted to a side surface of the back plate on an inner side in a vehicle-width direction,
wherein an ice and snow accumulation suppressing member including a wall portion, which extends from the back plate to the inner side in the vehicle-width direction while facing an inner peripheral surface of the rim portion and which is arranged at least below the anchor portion, is mounted to an outer peripheral edge portion of the back plate,
wherein, on a projected figure on a plane orthogonal to a rotation axis of the vehicle wheel, an outermost edge of the wall portion along a radial direction of the back plate is arranged outside of an imaginary circle which passes through an outermost end of the electric actuator in the radial direction and which is centered on the rotation axis,
wherein the wall portion is formed into an annular shape centered on the rotation axis,
wherein a wheel cylinder configured to exert power for obtaining a service brake state in the drum brake is mounted to an upper portion of the back plate, and
wherein a cutout is formed in a peripheral edge portion of the wall portion on an opposite side of the back plate at least above the rotation axis of the vehicle wheel.

2. The electric parking brake device for a vehicle according to claim 1, wherein the wall portion is formed into a shape that is increased in diameter with distance from the back plate.

3. The electric parking brake device for a vehicle according to claim 1, wherein the ice and snow accumulation suppressing member is formed of an iron-based metal and is welded directly to the back plate or to a mounting member firmly attached to the back plate.

4. The electric parking brake device for a vehicle according to claim 2, wherein the ice and snow accumulation suppressing member is formed of an iron-based metal and is welded directly to the back plate or to a mounting member firmly attached to the back plate.

* * * * *